US00RE42559E

(19) United States
(12) Reissued Patent
Wang

(10) Patent Number: US RE42,559 E
(45) Date of Reissued Patent: Jul. 19, 2011

(54) INFLATABLE PRODUCT PROVIDED WITH BUILT-IN BATTERY CASE AND SOCKET

(75) Inventor: Cheng Chung Wang, Taipei (TW)

(73) Assignee: Team Worldwide Corporation, Taipei (TW)

( * ) Notice: This patent is subject to a terminal disclaimer.

(21) Appl. No.: 10/747,010

(22) Filed: Dec. 24, 2003

Related U.S. Patent Documents

Reissue of:
(64) Patent No.: 6,332,760
Issued: Dec. 25, 2001
Appl. No.: 09/542,477
Filed: Apr. 4, 2000

(51) Int. Cl.
*F04B 19/00* (2006.01)
*F04B 17/00* (2006.01)
*A47C 27/08* (2006.01)

(52) U.S. Cl. ..... 417/411; 417/239; 5/706

(58) Field of Classification Search ..... 417/239, 417/360, 411, 423.15, 238; 5/706
See application file for complete search history.

(56) References Cited

U.S. PATENT DOCUMENTS

| | | | | |
|---|---|---|---|---|
| 388,037 | A | | 8/1888 | Hargin |
| 3,068,494 | A | | 12/1962 | Pinkwater |
| 3,112,502 | A | | 12/1963 | Forsberg |
| 4,390,226 | A | | 6/1983 | Hohn |
| 4,394,784 | A | | 7/1983 | Swenson et al. |
| 4,619,481 | A | | 10/1986 | Grudzinskas |
| 4,678,014 | A | * | 7/1987 | Owen et al. ..... 141/67 |
| 4,702,235 | A | | 10/1987 | Hong |
| 4,766,628 | A | | 8/1988 | Walker |
| 4,862,533 | A | | 9/1989 | Adams, III |
| 4,890,344 | A | | 1/1990 | Walker |
| 4,945,588 | A | | 8/1990 | Cassidy et al. |
| 4,977,633 | A | | 12/1990 | Chaffee |
| 5,020,517 | A | | 6/1991 | Foster, Jr. et al. |
| 5,057,819 | A | * | 10/1991 | Valenti ..... 340/573.1 |
| 5,068,933 | A | * | 12/1991 | Sexton ..... 5/644 |
| 5,127,808 | A | | 7/1992 | Nichols et al. |
| 5,216,778 | A | | 6/1993 | Suzuki et al. |
| 5,249,319 | A | * | 10/1993 | Higgs ..... 5/714 |
| 5,267,363 | A | | 12/1993 | Chaffee |
| 5,297,545 | A | | 3/1994 | Infante |
| 5,367,326 | A | | 11/1994 | Pond et al. |
| 5,367,726 | A | | 11/1994 | Chaffee |

(Continued)

FOREIGN PATENT DOCUMENTS

DE 297 21 150 3/1998

OTHER PUBLICATIONS

Supreme-Fast Fill, (Comfort Rest); Intex Recreation Corp., Long Beach, CA 90801-1440, Instruction Manual, Supreme Fast-Fill Airbed, pp. 1-8, 2000.

(Continued)

*Primary Examiner* — Charles G Freay

(57) ABSTRACT

An inflatable product includes an inflatable body, a socket, an electric pump and a battery case. The socket is built in the inflatable body. The electric pump is detachably connected to the socket to pump the inflatable body. The battery case is also built in the inflatable body for receiving batteries to supply the electric pump with power.

29 Claims, 8 Drawing Sheets

U.S. PATENT DOCUMENTS 5,503,618 A * 4/1996 Rey ..... 601/15
5,522,337 A 6/1996 Meyers et al.
5,542,136 A 8/1996 Tappel
5,584,084 A 12/1996 Klearman et al.
5,586,347 A 12/1996 Frischknecht
5,605,482 A 2/1997 Choy
5,606,756 A 3/1997 Price
5,687,438 A 11/1997 Biggie et al.
5,711,041 A 1/1998 Chen
5,771,514 A 6/1998 Wilhoit
5,794,289 A * 8/1998 Wortman et al. ..... 5/713
5,827,052 A 10/1998 Wang
5,848,875 A 12/1998 San-Jou
5,890,882 A 4/1999 Feldman
5,931,207 A 8/1999 Gianino
5,941,272 A 8/1999 Feldman
6,014,784 A 1/2000 Taylor et al.
6,119,292 A 9/2000 Haas
6,237,653 B1 * 5/2001 Chaffee ..... 141/313
6,253,401 B1 7/2001 Boyd
6,287,095 B1 9/2001 Saputo et al.
6,312,400 B1 11/2001 Itikawa
6,315,526 B1 11/2001 Jones
6,321,400 B1 11/2001 Gulino
6,457,192 B2 10/2002 Choi et al.
6,543,073 B2 4/2003 Wu
6,591,437 B1 7/2003 Phillips
6,651,283 B1 11/2003 Cook et al.
6,679,686 B2 1/2004 Wang
6,722,306 B1 4/2004 Wang
6,733,254 B1 5/2004 Yen
6,793,469 B2 * 9/2004 Chung ..... 417/411
6,836,914 B1 1/2005 Tsai
7,025,576 B2 4/2006 Chaffee
7,039,972 B2 5/2006 Chaffee
2001/0044969 A1 11/2001 Chaffee
2003/0215340 A1 11/2003 Chung
2004/0037717 A1 2/2004 Wang
2005/0079077 A1 4/2005 Tsai et al.

OTHER PUBLICATIONS

U.S. Appl. No. 10/647,814, Examiner's Answer, mailed on May 27, 2010.
U.S. Appl. No. 11/032,550, Final Office Action, mailed on Jul. 22, 2010.
U.S. Appl. No. 90/008,926, Decision on Appeal, mailed on Jul. 22, 2010.

* cited by examiner

INFLATABLE PRODUCT PROVIDED WITH BUILT-IN BATTERY CASE AND SOCKET

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates in general to an inflatable product provided with a built-in battery case and socket.

2. Description of the Related Art

Referring to FIGS. 1A and 1B, a conventional electric pump 14 for inflating an airbed has a fan and motor 142 inside. A plurality of batteries 144 are loaded into the electric pump 14 to supply the power. The airbed 10 is provided with a valve 12. In operation, the electric pump 14 is moved in direction B to connect the valve 12 and then rotated in direction A to fasten the connection between the electric pump 14 and the airbed 10.

SUMMARY OF THE INVENTION

An object of the present invention is to provide a modified airbed, which is inflated and deflated in a different way.

The airbed of the present invention includes an inflatable body, a socket, an electric pump and a battery case. The socket is built in the airbed. The electric pump is detachably connected to the socket to pump the airbed. The battery case is also built in the airbed for receiving batteries to supply the electric pump with power.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1A:
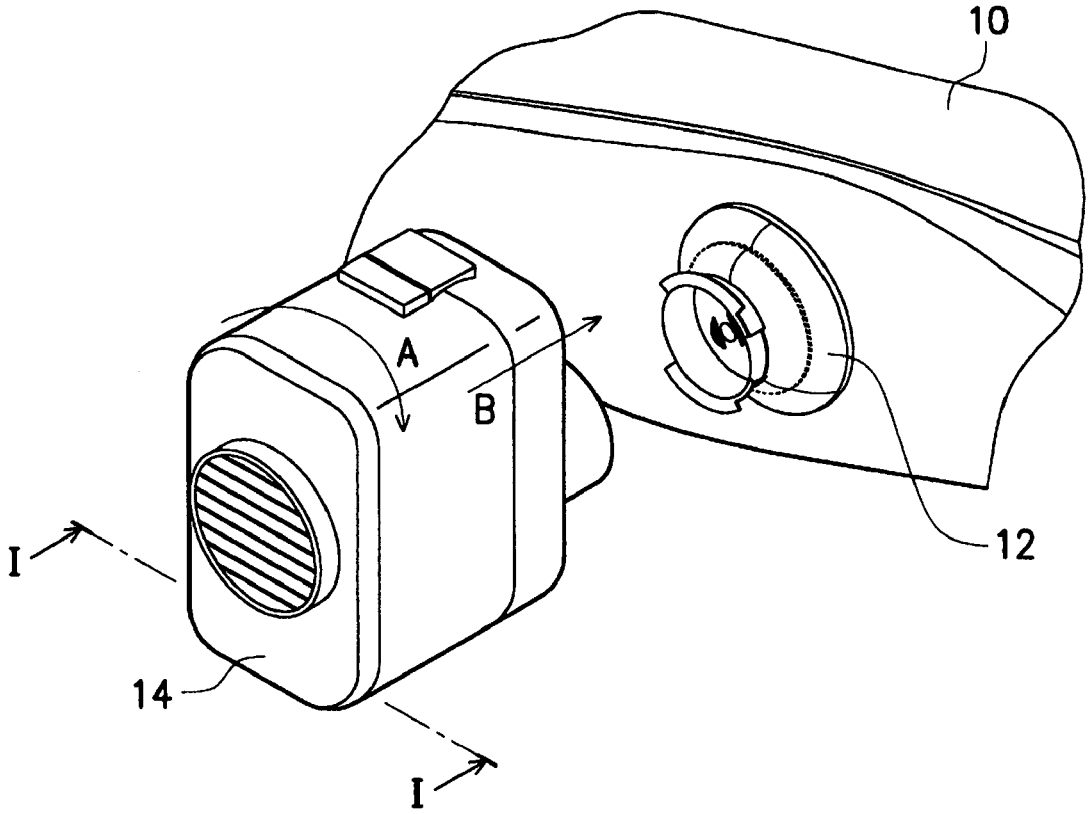
FIG. 1A (PRIOR ART)
FIG. 1A depicts a conventional airbed.
Figure 1B:
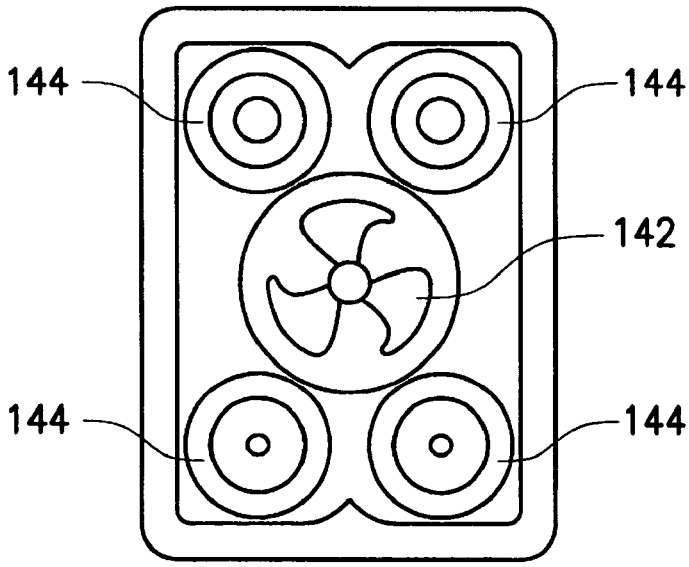
FIG. 1B (PRIOR ART)
FIG. 1B is a sectional view along line I-I in FIG. 1A.
Figure 2:
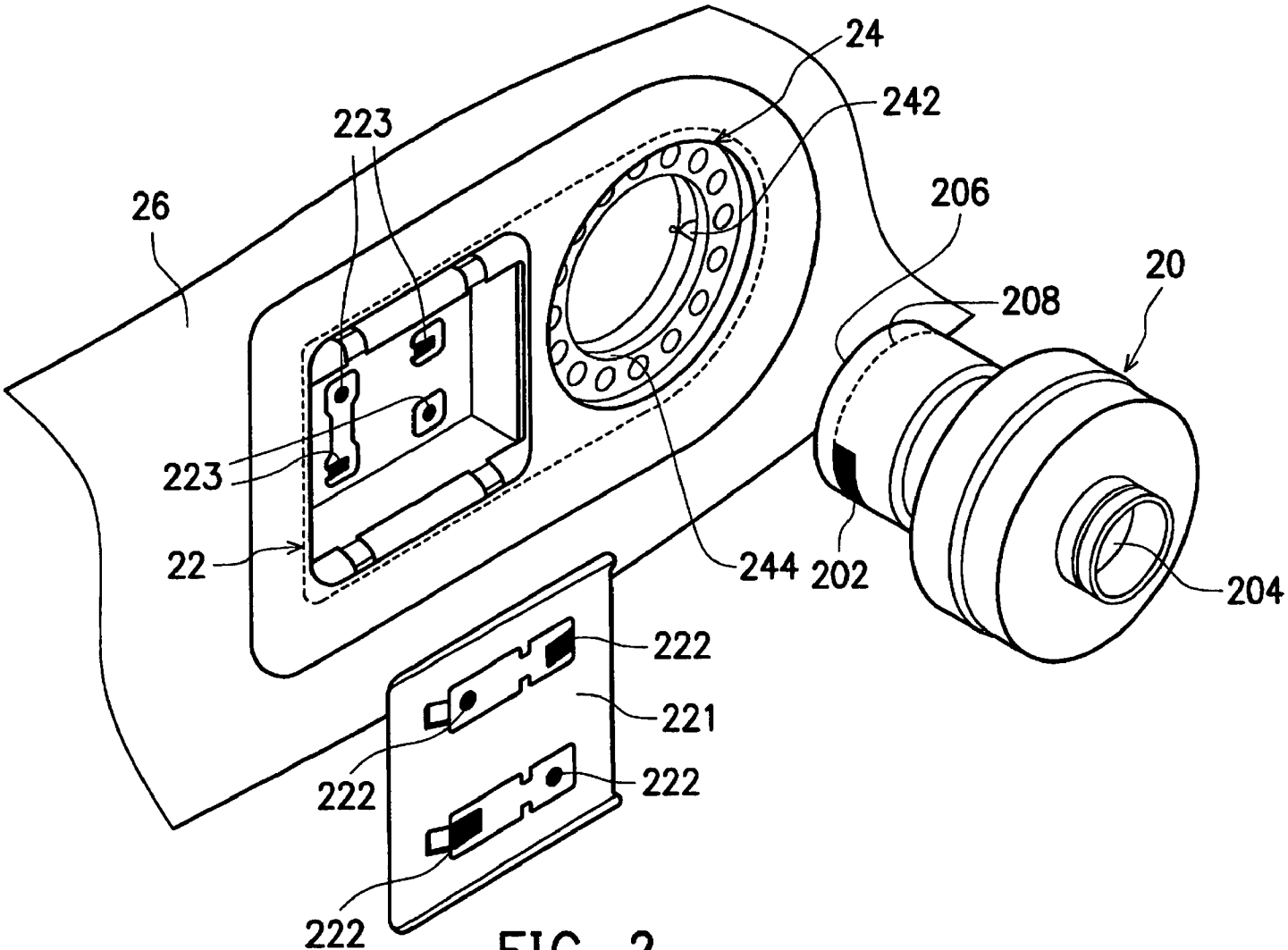
FIG. 2 locally depicts an airbed in accordance with a first embodiment of the present invention.

Referring to FIG. 2, an airbed 26 of a first embodiment of the present invention is provided with a detachable electric pump 20, a built-in battery case 22 and a built-in socket 24. The battery case 22 has a cover 221 on which electrodes 222 are provided. Also, on the bottom of the battery case 22 are provided electrodes 223 corresponding to the electrodes 222 of the cover 221. An O-ring 244 and an electrode 242 are provided on the inner wall of the socket 24, wherein the electrode 242 is electrically connected to the electrodes 222, 223 of the battery case 22. Furthermore, the electric pump 20 is substantially cylindrical and has an electrode 202 on its side surfaces, an air inlet 204 and an air outlet 206 on its ends and a check valve 208 inside. The check valve 208 of the electric pump allows air to flow in a single direction from the inlet 204 to the outlet 206.

Figure 3B:
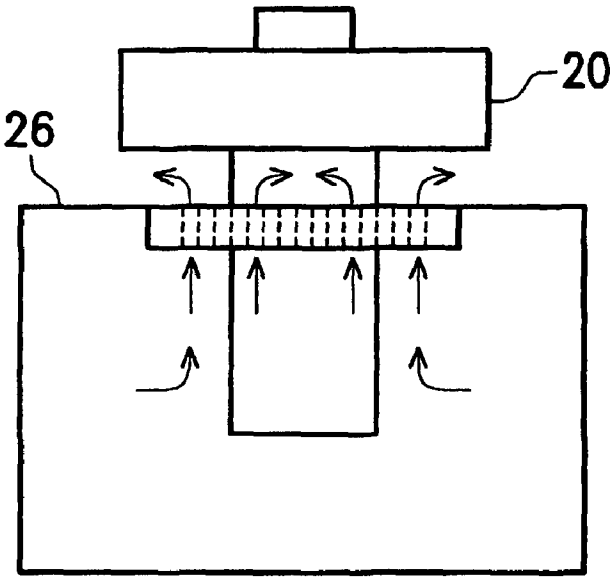
FIG. 3B shows the deflating operation of the airbed of the first embodiment.
Figure 3A:
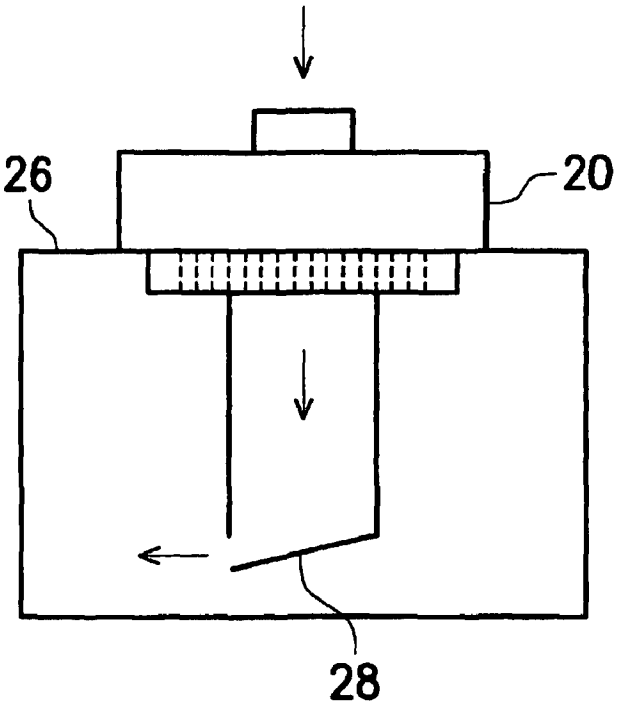
FIG. 3A shows the inflating operation of the airbed of the first embodiment.

In operation, batteries are loaded into the battery case 22. The electric pump 20 is fitted into the socket 24 and then rotated so that the electrode 202 of the electric pump 20 contacts the electrode 242 of the socket 24. Then, the electric pump 20 is actuated to pump outside air into the airbed 26 as shown in FIG. 3A. The O-ring 242 in the socket 24 prevents the airbed 26 from leaking. In deflating operation, the user detaches the electric pump 20 from the socket 24 to deflate the airbed 26, as shown in FIG. 3B.

It is understood that the O-ring can be provided on the side surfaces of the electric pump 20 instead of in the socket 24 to prevent the airbed from leaking.

Figure 4:
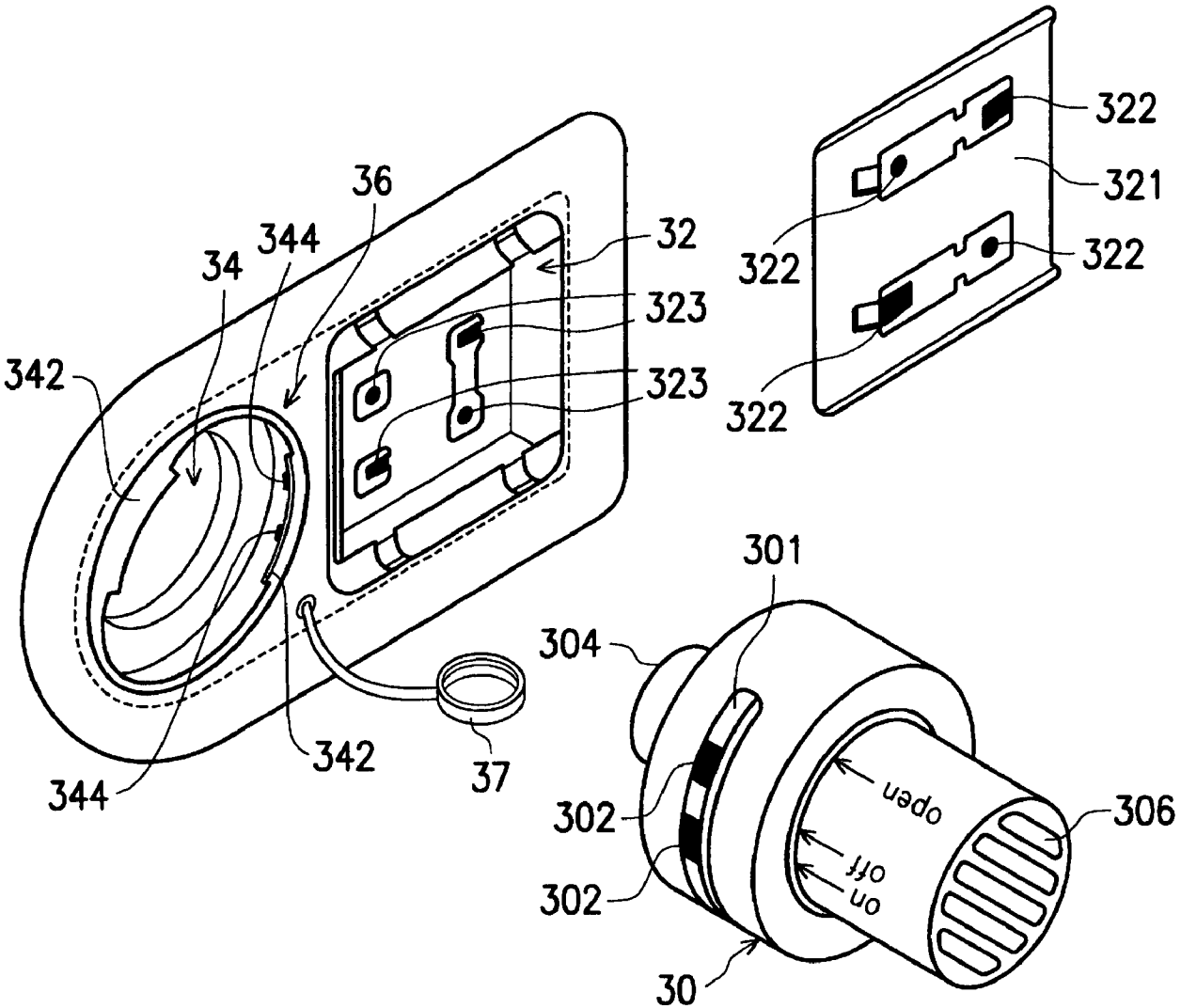
FIG. 4 locally depicts an airbed in accordance with a second embodiment of the present invention.
Figure 5:
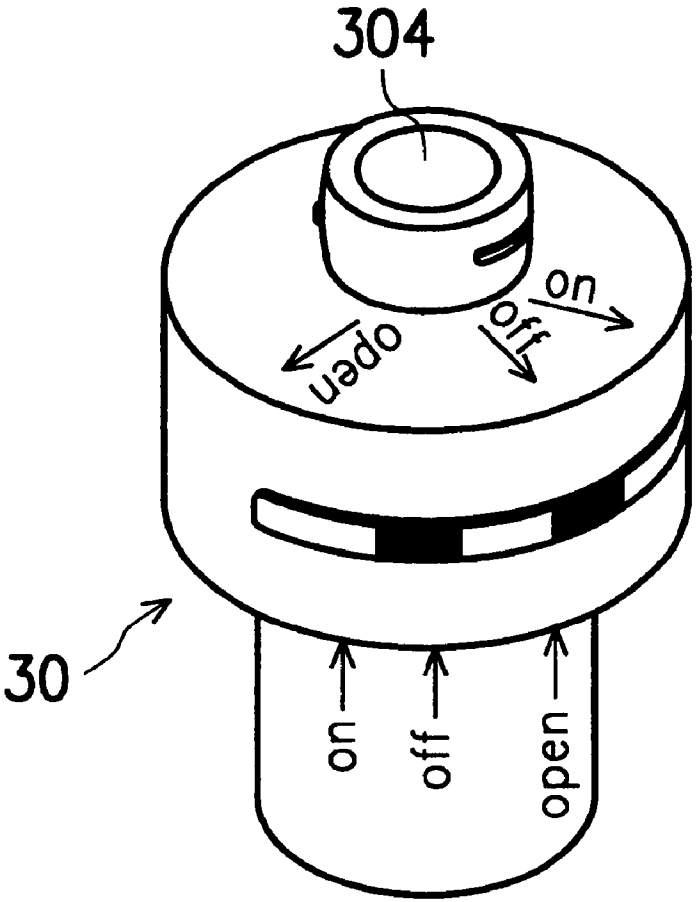
FIG. 5 is a perspective diagram of the electric pump of the second embodiment.

Referring to FIG. 4, an airbed of a second embodiment of the present invention is provided with a detachable electric pump 30, a cap 37 for the electric pump 30, a built-in battery case 32 and a built-in socket 34. The battery case 32 has a cover 321 on which electrodes 322 are provided. Also, on the bottom of the battery case 32 are provided electrodes 323 corresponding to the electrodes 322 of the cover 321. Furthermore, an arrow symbol 36 is marked on the airbed and besides the socket 34. Flanges 342 are formed at the rim of the socket 34, while electrodes 344 are provided on the inner wall of the socket 34 and are electrically connected to the electrodes 322, 323 of the battery case 32. Furthermore, the electric pump 30 is substantially cylindrical and has a flange 301 on its side surfaces, two electrodes 302 provided on the flange 301, an air inlet 304 and an air outlet 306 on its ends. Also referring to FIG. 5, symbols "on", "off" and "open" are marked on the side surfaces and the end of the electric pump 30.

Figure 6A:
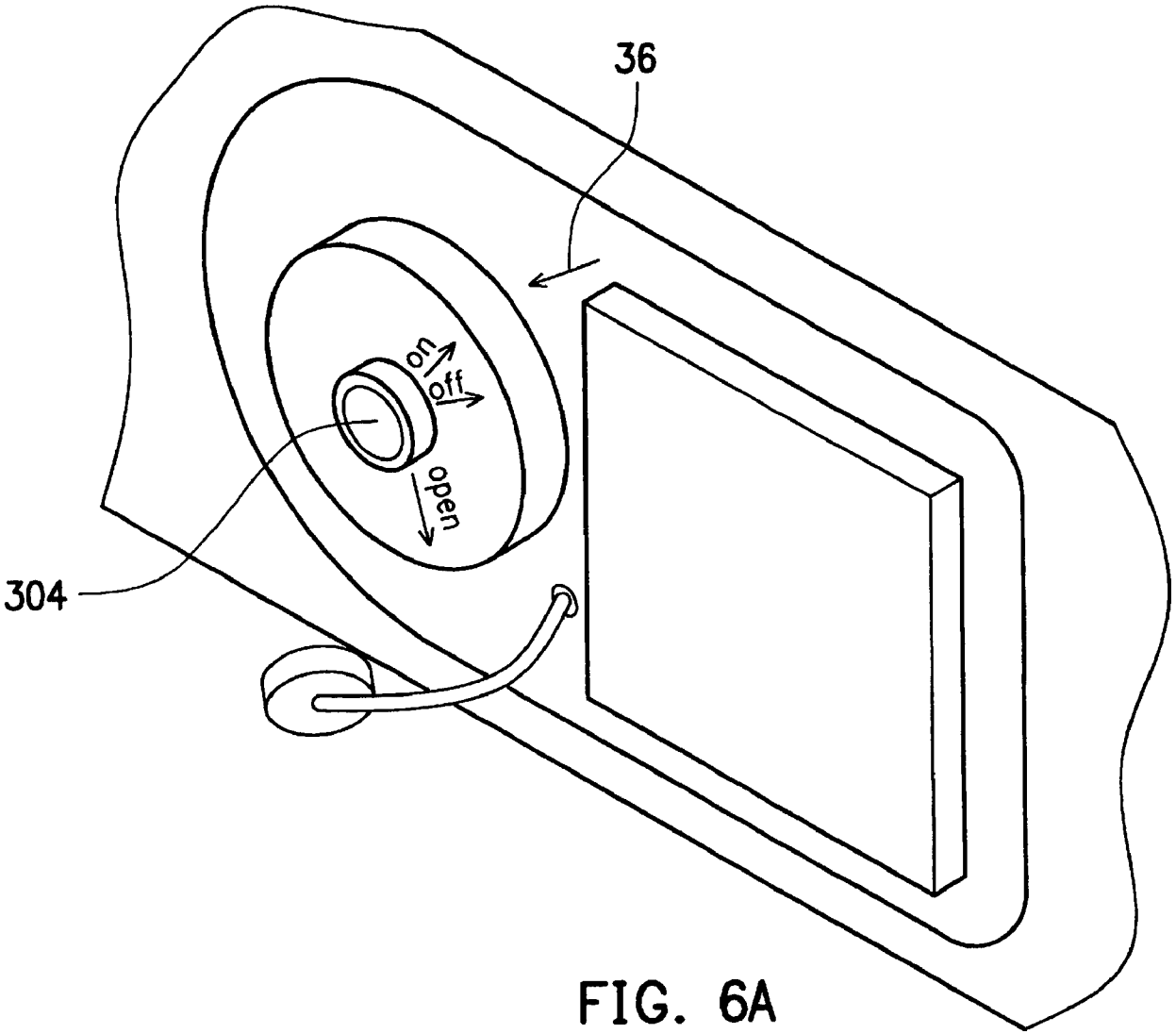
FIGS. 6A, 6B and 6C show the inflating operation of the airbed of the second embodiment.
Figure 6C:
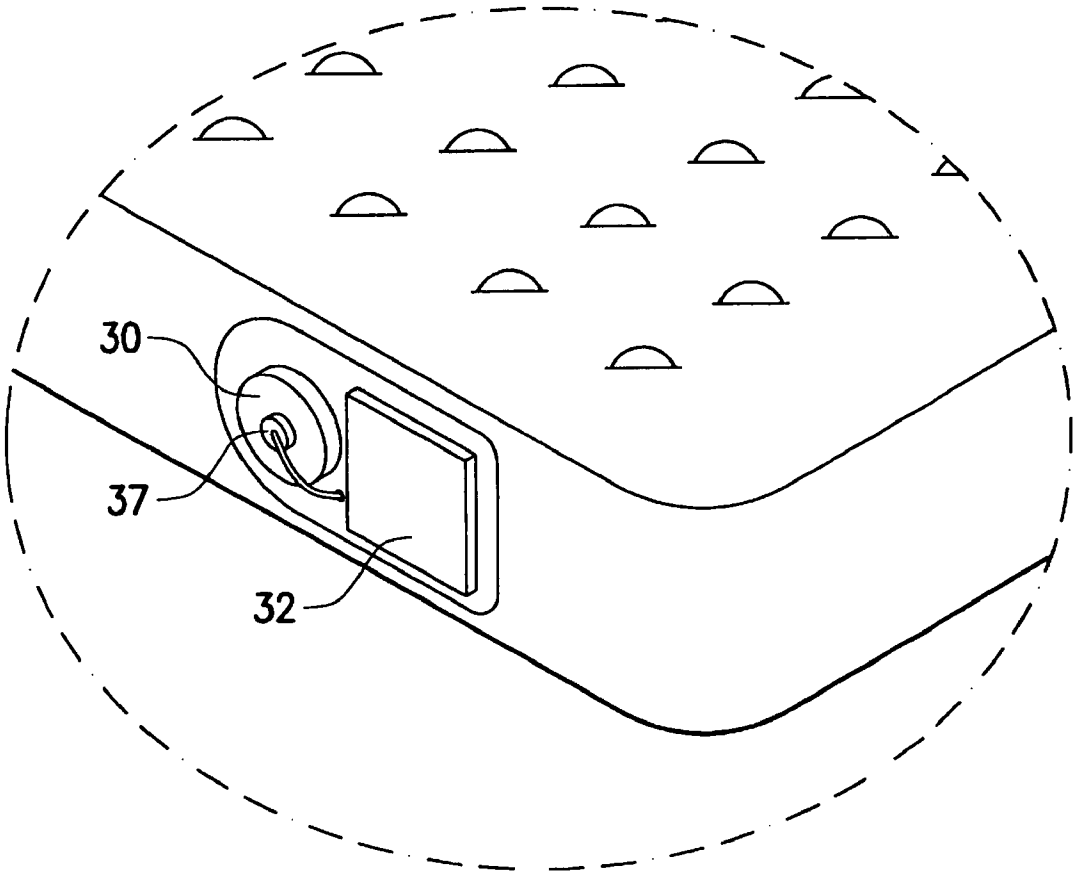
Figure 6B:
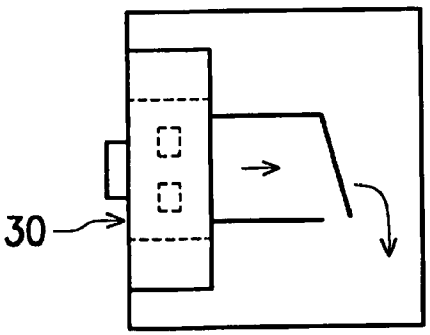

In operation, batteries are loaded into the battery case 32 to supply the electric pump 30 with the power. The electric pump 30 in this embodiment is used to inflate or deflate the airbed. In inflating operation, the electric pump 30 is fitted into the socket 34 with the air outlet 306 inside the airbed and the air inlet 304 outside the airbed. The electric pump 30 is rotated to change the positions of symbols "on", "off" and "open". When the arrow symbol 36 points at the symbol "on" as shown in FIG. 6A, the electrodes 302 of the electric pump 30 contact the electrodes 344 of the socket 34 to actuate the electric pump 30. Then, outside air is pumped into the airbed as shown in FIG. 6B. When the arrowsymbol 36 points at the symbol "off", the electric pump 30 is stopped. When the arrow symbol 36 points at the symbol "open", the electric pump 30 is detachable from the socket 34. FIG. 6C depicts the airbed full of air, wherein the air outlet of the electric pump 30 is closed by the cap 37 to seal the airbed after the inflating operation.

Figure 7B:
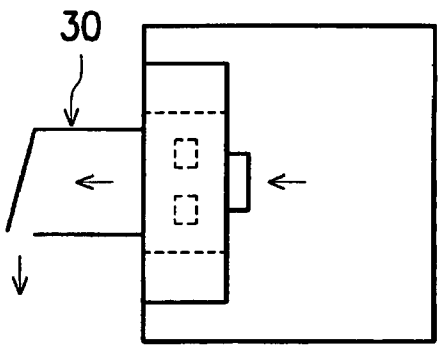
FIGS. 7A and 7B show the deflating operation of the airbed of the second embodiment.
Figure 7A:
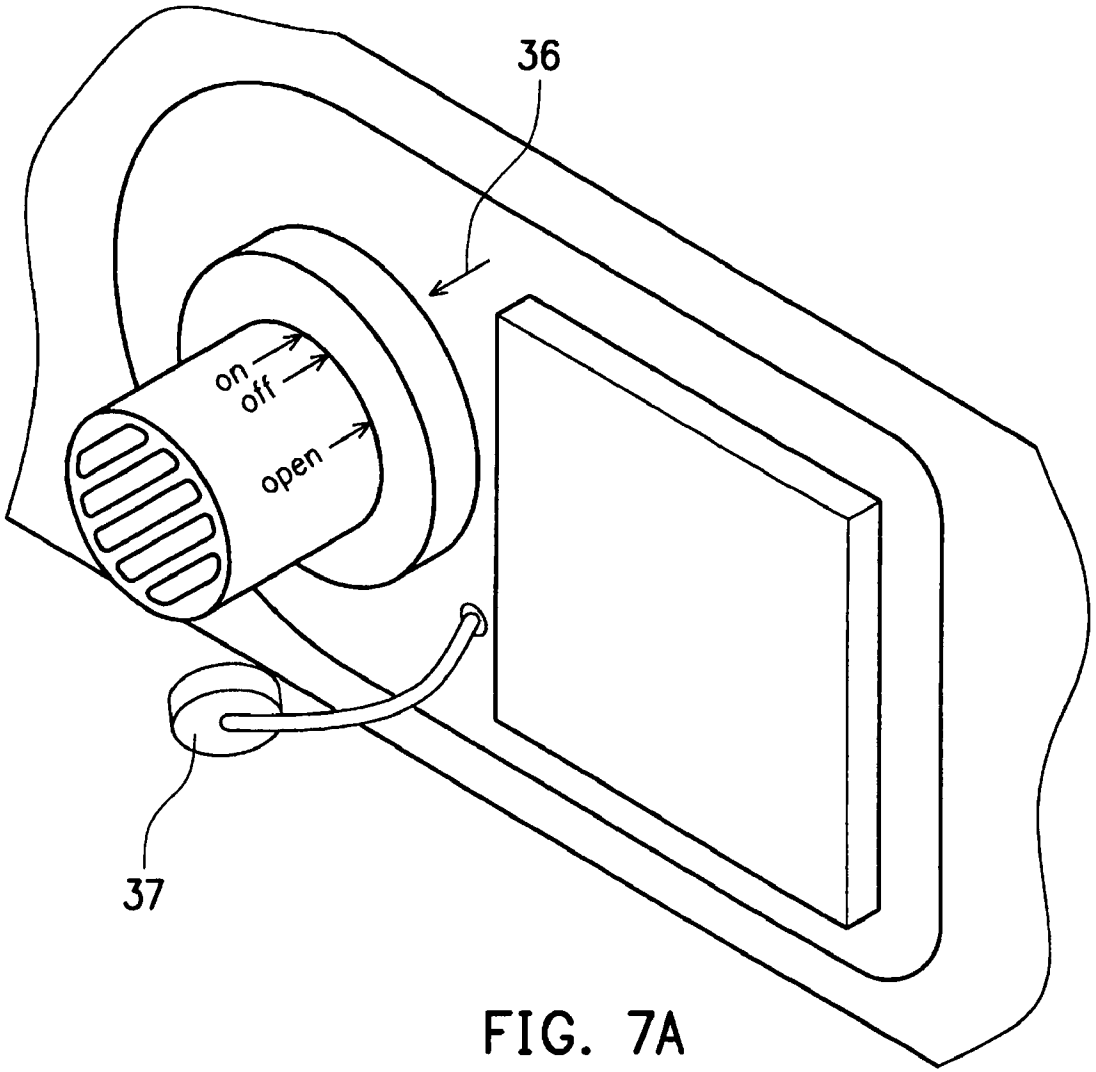

In deflating operation, the electric pump 30 is reversely fitted into the socket 34, with the air inlet 304 inside the airbed and the air outlet 306 outside the airbed. The electric pump 30 is rotated to change the positions of symbols "on", "off" and "open" on its side surfaces. When the arrow symbol 36 points at the symbol "on" as shown in FIG. 7A, the electrodes 302 of the electric pump 30 contact the electrodes 344 of the socket 34 to actuate the electric pump 30. Then, air inside the airbed is pumped out as shown in FIG. 7B. When the arrow symbol 36 points at the symbol "off", the electric pump 30 is stopped.

When the arrow symbol 36 points at the symbol "open", the electric pump 30 is detachable from the socket 34.

In either of the inflating and deflating operations, the flanges 342 of the socket 34 are used for confining the flange 301 of the electric pump 30, thus preventing the electric pump 30 from separating with the socket 34 when the arrow symbol 36 points at the symbols "on" and "off". However, the flanges 342 are spaced apart at the rim of the socket 34 to avoid confining the flange 301 of the electric pump 30 when the arrow symbol 36 points at the symbol "open". Thus, the electric pump 30 is detachable from the socket 34 when the arrow symbol 36 points at the symbol "open".

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An inflatable product including:

an inflatable body;

a socket built in the inflatable body;

an electric pump, *including a pump body,* detachably connected to the socket to pump the inflatable body, *wherein at least one portion of the pump body is contained in the socket*; and a battery case also built in the inflatable body for receiving batteries to supply the electric pump with power.

2. An inflatable product as claimed in claim 1, wherein the socket has at least one first electrode inside to electrically connect the batteries, the electric pump has at least one second electrode, the electric pump is actuated to pump the inflatable body when the electric pump is rotated to a first position so that the at least one second electrode contacts the at least one first electrode, and the electric pump is stopped when the electric pump is rotated to a second position so that the at least one first electrode and the at least one second electrode separate.

3. An inflatable product as claimed in claim 2, wherein the socket further has confining means for preventing the electric pump from separating with the socket when the electric pump is at the first and second positions, and the electric pump is released from the confining means when the electric pump is rotated to a third position.

[4. A method of inflating an inflatable product including the steps of:

providing an electric pump;

providing a built-in battery case in the inflatable product;

loading batteries into the battery case; and connecting the electric pump to a socket in a first direction to pump the inflatable product, wherein the batteries supply the electric pump with power.]

[5. A method as claimed in claim 4, further including the step of separating the electric pump from the socket to directly deflate the inflatable product through the socket.]

[6. A method as claimed in claim 4, further including the steps of:

(d) separating the electric pump from the socket;

(e) connecting the electric pump to the socket in a second direction opposite to the first direction to pump air inside the inflatable product out.]

7. An inflatable product as claimed in claim 1, wherein the socket has at least one first electrode inside to electrically connect the batteries, the electric pump has at least one second electrode, the electric pump is actuated to deflate the inflatable body when the electric pump is rotated to a first position so that the at least one second electrode contacts the at least one first electrode, and the electric pump is stopped when the electric pump is rotated to a second position so that the at least one first electrode and the at least one second electrode separate.

8. An inflatable product including:

an inflatable body;

a socket built in the inflatable body;

an electric pump, *including a pump body,* detachably connected to the socket to pump the inflatable body, *wherein at least one portion of the pump body is contained in the socket*;

a battery case also built in the inflatable body; and at least one battery disposed in the battery case to supply the electric pump with power.

*9. An inflatable product including:*

*an inflatable body;*

*a socket built in the inflatable body;*

*an electric pump, including a pump body directly connected to the socket to pump the inflatable body, wherein the pump body is wholly or partially indented into the inflatable body; and*

*a battery case built in the inflatable body for receiving batteries to supply the electric pump with power.*

*10. An inflatable product as claimed in 9, wherein the socket has at least one first electrode inside, and the electric pump has at least one second electrode.*

*11. An inflatable product as claimed in 10, wherein the at least one first electrode electrically connects to the batteries.*

*12. An inflatable product as claimed in 10, wherein the electric pump is actuated to pump the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*13. An inflatable product as claimed in claim 12, wherein the socket further has confining means for preventing the electric pump from separating with the socket when the electric pump is at the first and second positions, and the electric pump is released from the confining means when the electric pump is rotated to a third position.*

*14. An inflatable product as claimed in claim 10, wherein the electric pump is actuated to deflate the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*15. An inflatable product as claimed in 9, further comprising:*

*at least one battery disposed in the battery case to supply the electric pump with power.*

*16. An inflatable product as claimed in 15, wherein the socket has at least one first electrode inside, and the electric pump has at least one second electrode.*

*17. An inflatable product as claimed in 16, wherein the at least one first electrode electrically connects to the at least one battery.*

*18. An inflatable product as claimed in 16, wherein the electric pump is actuated to pump the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*19. An inflatable product as claimed in claim 18, wherein the socket further has confining means for preventing the electric pump from separating with the socket when the electric pump is at the first and second positions, and the electric pump is released from the confining means when the electric pump is rotated to a third position.*

*20. An inflatable product as claimed in claim 16, wherein the electric pump is actuated to deflate the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*21. An inflatable product including:*

*an inflatable body;*

*a socket built in the inflatable body;*

*an electric pump, including a pump body, connected to the socket to pump the inflatable body, wherein at least one portion of the pump body is contained in the socket; and*

*a battery case built in the inflatable body for receiving batteries to supply the electric pump with power.*

*22. An inflatable product as claimed in 21, wherein the socket has at least one first electrode inside, and the electric pump has at least one second electrode.*

*23. An inflatable product as claimed in 22, wherein the at least one first electrode electrically connects to the batteries.*

*24. An inflatable product as claimed in 22, wherein the electric pump is actuated to pump the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*25. An inflatable product as claimed in claim 24, wherein the socket further has confining means for preventing the electric pump from separating with the socket when the electric pump is at the first and second positions and the electric pump is released from the confining means when the electric pump is rotated to a third position.*

*26. An inflatable product as claimed in claim 22, wherein the electric pump is actuated to deflate the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*27. An inflatable product as claimed in 21, further comprising:*

*at least one battery disposed in the battery case to supply the electric pump with power.*

*28. An inflatable product as claimed in 27, wherein the socket has at least one first electrode inside, and the electric pump has at least one second electrode.*

*29. An inflatable product as claimed in 28, wherein the at least one first electrode electrically connects to the at least one battery.*

*30. An inflatable product as claimed in 28, wherein the electric pump is actuated to pump the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

*31. An inflatable product as claimed in claim 30, wherein the socket further has confining means for preventing the electric pump from separating with the socket when the electric pump is at the first and second positions, and the electric pump is released from the confining means when the electric pump is rotated to a third position.*

*32. An inflatable product as claimed in claim 28, wherein the electric pump is actuated to deflate the inflatable body when the electric pump is rotated to a first position so that the at least one second electrode contacts the at least one first electrode, and the electric pump is stopped when the electric pump is rotated to a second position so that the at least one first electrode and the at least one second electrode separate.*

* * * * *